United States Patent
Mataki et al.

(10) Patent No.: US 7,499,618 B2
(45) Date of Patent: Mar. 3, 2009

(54) OPTICAL ELEMENT

(75) Inventors: Hiroshi Mataki, Shiga (JP); Toshimi Fukui, Shiga (JP)

(73) Assignee: Konica Minolta Opto, Inc., Tokyo (JP)

( * ) Notice: Subject to any disclaimer, the term of this patent is extended or adjusted under 35 U.S.C. 154(b) by 22 days.

(21) Appl. No.: 10/866,993

(22) Filed: Jun. 15, 2004

(65) Prior Publication Data

US 2005/0078926 A1  Apr. 14, 2005

(30) Foreign Application Priority Data

Jun. 17, 2003  (JP) .............................. 2003-171631

(51) Int. Cl.
  *G02B 6/10* (2006.01)
(52) U.S. Cl. ...................... 385/129; 385/141
(58) Field of Classification Search ................. 359/599, 359/454, 707, 726, 653, 708, 720; 524/492, 524/493, 588; 385/129, 141
See application file for complete search history.

(56) References Cited

U.S. PATENT DOCUMENTS 6,833,965 B2 * 12/2004 Togino et al. ............... 359/726

FOREIGN PATENT DOCUMENTS

JP  8-217991  8/1996
JP  2001-201601  7/2001

OTHER PUBLICATIONS

Hiroshi Mataki et al., "Yuki Muki Fukugo Random Nano Kozotai o Mochiita Athermal Kogaku Zairyo no Kaihatsu", 2003 Nen (Heisei 15 nen), Shuki Dai 64 Kai Extended abstracts, the Japan Society of Applied Physics Gakujutsu Koenkai Koen Yokoshu, Dai 3 Bunsatsu, Aug. 30, 2003, p. 1096, 2p-YK-1.

* cited by examiner

*Primary Examiner*—Robert D. Harlan
(74) *Attorney, Agent, or Firm*—Finnegan, Henderson, Farabow, Garrett & Dunner, L.L.P.

(57) ABSTRACT

An optical element for controlling light propagation including: transparent material; and inorganic fine particles dispersed in the transparent material, wherein the transparent material and the inorganic fine particles meet at least one of following a) and b): a) a rate of change of a refractive index of the transparent material with temperature and a rate of change of a refractive index of the inorganic fine particles with temperature are opposite in sign; b) a thermal expansion coefficient of the transparent material and a thermal expansion coefficient of the inorganic fine particles are opposite in sign.

14 Claims, 6 Drawing Sheets

OPTICAL ELEMENT

BACKGROUND OF THE INVENTION

1. Field of the Invention

The present invention relates to an optical element suitably used for a lens, a filter, a grating, an optical fiber, a planar optical waveguide, and the like. In particular, the present invention relates to an optical element whose refractive index does not change with temperature.

2. Description of Related Art

An optical element such as a lens, a filter, a grating, an optical fiber and a planar optical waveguide is formed of transparent material as an optical element for controlling a mode of light propagation such as transmission, reflection, refraction, and diffraction in modern society. Transparent inorganic materials such as silicic glass materials and metallic oxides are in widespread use as transparent material. Whereas, in recent years, transparent organic polymers with superior moldability, economy, and lightweight properties have also become widespread, and have come into practical use as lenses for spectacles, objective lenses for optical disk, plastic optical fibers, polymer planar optical waveguides, and the like. For example, there is some description in Fumio Ide, "Optoelectronics and Polymeric Material" Kyoritsu Shuppan (1995).

As for the transparent inorganic materials and transparent organic polymers, their refractive indexes, however, change with temperature. Therefore troubles often occur in the case of using them for optical elements generically referred to as lenses for an optical disk device, such as CD and DVD, trying to improve performance of the device by focusing light down to focusing limit (diffraction limit), and optical fibers and planar optical waveguides in which light propagates over a long distance. In particular, as for diffractive optical elements such as Bragg gratings used for optical communications and optical sensors, it is known that performance of the elements is deteriorated significantly because change of the refractive index causes change of the grating constant (optical distance equivalent to grating interval).

Figure 1A:
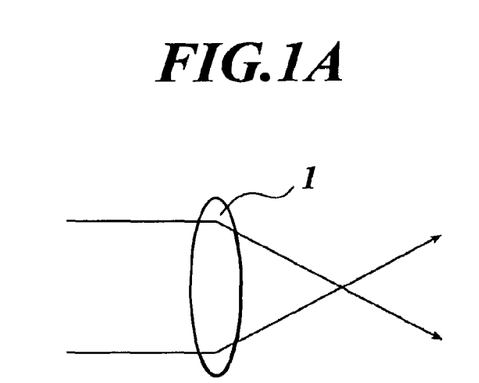
FIG. 1A is an illustration showing a lense in optical elements according to the present invention.
Figure 1B:
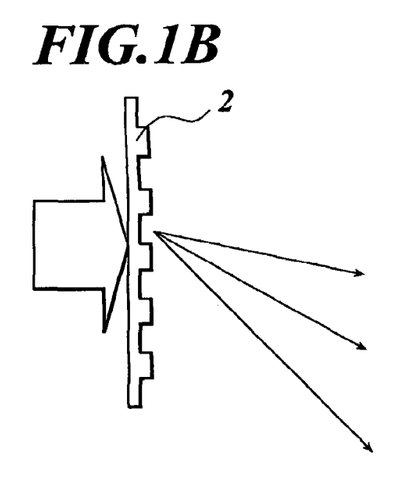
FIG. 1B is an illustration showing a grating in optical elements according to the present invention.
Figure 1C:
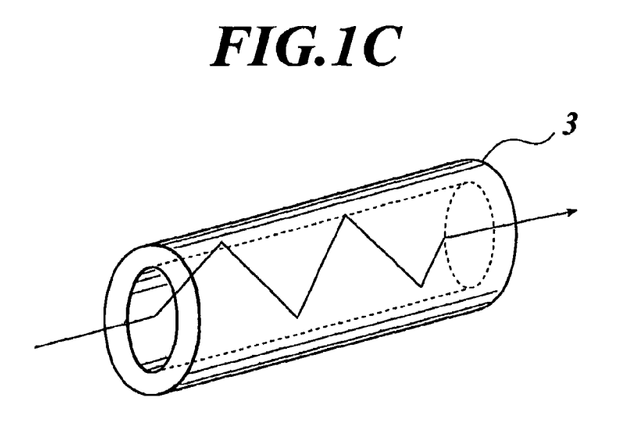
FIG. 1C is an illustration showing an optical fiber in optical elements according to the present invention.
Figure 1D:
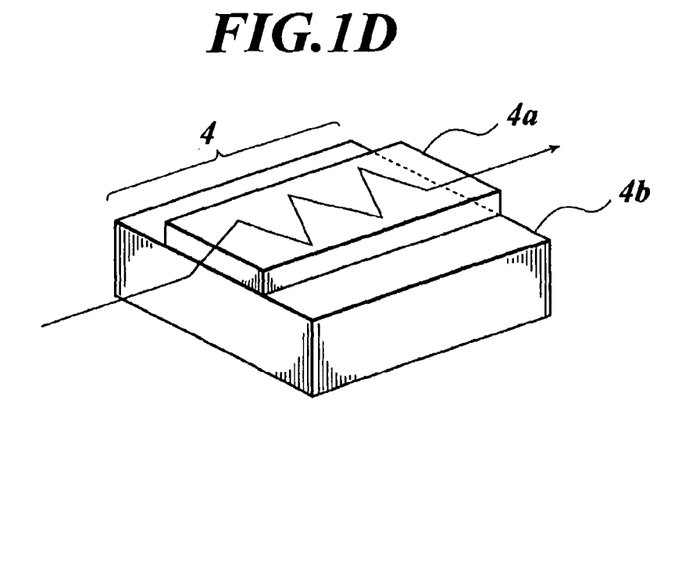
FIG. 1D is an illustration showing a planar optical waveguide in optical elements according to the present invention.

Conventionally, various methods have been proposed as a method for making the refractive index of transparent material temperature-independent (athermalizing). For example, in the case of a planar optical waveguide 4 illustrated by FIG. 1D, the following method that the waveguide 4 is constructed in such a way that the thermal expansion coefficient of material constituting an optical waveguide layer 4a and the thermal expansion coefficient (linear expansion coefficient) of material constituting a substrate 4b are opposite in sign, and the waveguide 4 is athermalized by compensating for change of the refractive index of the waveguide layer 4a due to temperature change, is proposed. As examples of the above method, Yasuo Kokubun, "Technology for Making Optical Circuit Independent of Temperature", Applied Physics, Vol. 66, pp. 934 (1997) and JP-Tokukai-2000-352633A are taken.

Alternatively, when a fiber Bragg grating is used, the method of supporting and packaging the fiber Bragg grating with a material having a thermal expansion coefficient opposite in sign to a silicic material constituting the fiber Bragg grating to compensate for thermal expansion of the silicic material is proposed. For example, A. Sakamoto et al., "IEICE Transactions on Electronics", Vol. E-83C, pp. 1441 (2000).

As a method for athermalizing transparent material itself instead of compensating by auxiliary material like this for temperature-dependent change of the refractive index of transparent material constituting an optical element, the method of doping transparent material with a material having a rate of change of the refractive index with temperature opposite in sign to the rate of change of the refractive index of transparent material with temperature is known. Methods like this are described in, for example, JP-Tokukai-2001-141945A and JP-Tokukai-2002-020136A.

However, methods like this are limited essentially to materials wherein a silicic glass material is doped with boron oxide as shown in the above-described gazettes. The methods do not make such widespread applications possible, as inorganic transparent materials except silicic glass and transparent materials composed of an organic polymer.

Furthermore methods of obtaining athermalized material by forming mixture or complex composed of two materials whose rates of change of the refractive indexes with temperature are opposite in sign are proposed. As an example of methods like these, the method described in JP-Tokukai-2001-201601A is taken. However as for this method, because of using means that organic material is mixed into inorganic glass material practically, there is a problem that phase separation of the inorganic material and the organic material occurs, and light scattering on phase separation interface undermines optical transparency. Suppression of this problem must rely on sol-gel method in which organic-inorganic complex is formed as starting material and then is heat-treated, as shown in the above-described gazette. In this case, there is a problem that it becomes difficult to apply this method to forming optical elements requiring high dimensional accuracy because of significant change in volume accompanying condensation polymerization in a molding process of optical elements.

As above, various methods are proposed as a method for forming athermalized optical elements. And yet problems remain, such as auxiliary material except transparent material forming an optical element is required, material series forming an optical element is limited, decrease of the transparency accompanying light scattering occurs, and dimensional distortion in a step for forming an optical element occurs.

SUMMARY OF THE INVENTION

The present invention is achieved in consideration of the above-described reasons. An object of the present invention is to provide an athermalized optical element that does not require auxiliary material to compensate for the rate of change of the refractive index with temperature, can be widely applied to both transparent materials of inorganic material and organic material, and is formed without decrease of transparency and dimension distortion.

After earnest study to solve the above-described problem, the inventors found out that athermalization is possible by combining inorganic fine particles satisfying a specific condition into transparent material forming an optical element.

That is, an optical element of the present invention is formed of composite material including optically transparent material and inorganic fine particles.

The object of the present invention can be achieved by the following example.

An optical element for controlling light propagation comprising:

transparent material; and inorganic fine particles dispersed in the transparent material, wherein the transparent material and the inorganic fine particles meet at least one of following a) and b):

a) a rate of change of a refractive index of the transparent material with temperature and a rate of change of a refractive index of the inorganic fine particles with temperature are opposite in sign;

b) a thermal expansion coefficient of the transparent material and a thermal expansion coefficient of the inorganic fine particles are opposite in sign.

By including transparent material and inorganic fine particles satisfying the above-described conditions a) and/or b), it is possible to provide an optical element composed of optical material suppressing the refractive index change dependent on temperature. In the case that an optical element can not keep its shape independently and is formed by some sort of support medium, substrate, or the like, it is possible to control the rate of change of the refractive index with temperature and/or the thermal expansion coefficient of complex composed of transparent material and inorganic fine particles so as to compensate for the rate of change of the refractive index with temperature and/or the thermal expansion coefficient of the support medium or substrate and athermalize the optical element as a whole.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

EXEMPLIFIED EMBODIMENTS OF THE INVENTION

As for an optical element in the present invention, preferably, the inorganic fine particle includes at least one inorganic material selected from the group consisting of $LiAlSiO_4$, $PbTiO_3$, $Sc_2W_3O_{12}$, $ZrW_2O_8$, $AlPO_4$, $Nb_2O_5$, $LiNbO_3$, PLZT. More preferably, the inorganic fine particles include at least one of $Nb_2O_5$ and $LiNbO_3$ among them.

As for an optical element in the present invention, preferably, the transparent material is an organic polymer.

Due to the above-described composition, it is possible to provide an athermal optical element with moldability, economy, and lightweight properties, and use various conventionally well-known methods for molding organic polymers.

As for an optical element of the present invention, preferably, the percent of the inorganic fine particles is not more than 95 wt % of the total amount of the organic polymer and the inorganic fine particles in terms of solid content.

This composition can express high optical transparency without scattering loss of light by secondary coagulation of inorganic fine particles.

An optical element of the present invention is an optical element for controlling a mode of light propagation such as transmission, reflection, refraction, and diffraction, and includes transparent material and inorganic fine particles whose rates of change of the refractive indexes with temperature are opposite in sign (their signs are different from each other) or transparent material and inorganic fine particles whose thermal expansion coefficients are opposite in sign.

Any combination that is composition material including optically transparent material and inorganic fine particles may be used as composite material constituting an optical element of the present invention. Composite material of transparent material and inorganic fine particles can be adjusted by such a conventional method, as mixing and dispersing transparent material and inorganic fine particles.

[Transparent Material]

Either of inorganic material and organic polymer which have substantially transparency in a wavelength range where an optical element is used, that is, which are optically transparent (have optical transparency) may be used as transparent material. Preferably, organic material is used from the viewpoint of moldability.

[Inorganic Material]

Oxides, such as silicon oxide, aluminum oxide, titanium oxide, zirconium oxide, hafnium oxide, niobium oxide, tantalum oxide, magnesium oxide, calcium oxide, strontium oxide, barium oxide, yttrium oxide, lanthanum oxide, cerium oxide, zinc oxide, indium oxide, tin oxide, and lead oxide, and multiple oxides composed of these oxides, phosphates and sulfates formed from combination of these oxides are used as inorganic material which is optically transparent (has optical transparency).

[Organic Polymer]

As examples of organic polymers which are optically transparent (have optical transparency), polymethylmethacrylate, polycyclohexylmethacrylate, polybenzylmethacrylate, polyphenylmethacrylate, polycarbonate, polyethylene-terephthalate, polystyrene, polytetrafluoroethylene, poly-4-methylpentene-1, polyvinylalcohol, polyethylene, polyacrylonitrile, styrene acrylonitrile copolymer, polyvinyl chloride, polyvinyl carbazole, styrene maleic anhydride copolymer, polyolefin, and the like can be taken. Substantially transparent organic polymers at a target wavelength may be used for an optical element of the present invention. Each of the organic polymers may be used singularly and may be also used with combination of two or more kinds. The organic polymers dissolved to solvent or fused by heat can be formed into a target form of an optical element. Furthermore monomer, oligomer, which are precursors of the organic polymer, and mixture of monomer, oligomer and the organic polymer may be used as starting material and be polymerized in a process for being formed into a target form of an optical element.

Moreover the organic polymers may include a functional group stimulating such a reaction as addition, cross-linkage, and polymerization, in their main chain or side chains. As examples of the functional group, a hydroxyl group, a carbonyl group, a carboxyl group, a diazo group, a nitro group, a cynnamoyl group, acryloyl group, an imide group, an epoxy group, and the like can be taken.

The organic polymer may include such an additive as a plasticizer, a stabilization agent such as an antioxidant, an interfacial active agent, a dissolution accelerating agent, a polymerization inhibitor, and a coloring agent such as a dye and a pigment. Additionally the organic polymer may include a solvent (water or an organic solvent, such as alcohols, glycols, cellosolves, ketones, esters, ethers, amides, and hydrocarbons) for improvement of workability such as coating processibility.

The organic polymer may be a photosensitive macromolecule. The photosensitive macromolecule may be either of a negative type photosensitive macromolecule whose exposed portion becomes hardened and insoluble and a negative type photosensitive macromolecule whose exposed portion becomes soluble. As for the photosensitive macromolecule, the macromolecule may have photosensitivity per se and also may be a resin composition made of mixture of a macromolecule and a photosensitive compound. What has photosensitivity in a macromolecule itself includes a diazonium base containing macromolecule, an azide group containing macromolecule, and a cinnamoyl group, such as polyvinyl cinnamate, containing macromolecule.

A photosensitive compound which is mixed with a polymer to form a photosensitive resin composition includes a compound containing a (meth)acryloyl group, a hydroxyl group, an alkoxyl group, a carboxyl group, an ester group, an ether group, an amide or N-substituted amide group, a nitrile group, a glycidyl group or a halogen. Because the organic polymer is a photosensitive macromolecule, it is possible to form optical elements with various shapes and patterns easily by using well-known exposure process technology, such as photolithography method, without mechanical processing such as cutting, machining, and polishing.

[Inorganic Fine Particle]

Any material that has a rate of change of a refractive index with temperature or a thermal expansion coefficient which is opposite in sign to transparent material forming an optical element may be used as inorganic fine particles. In general, the refractive index of material decreases with increase of temperature (a sign of a rate of change with temperature is minus), and many materials have a sign of a thermal expansion coefficient which is plus. In particular, organic polymers almost exclusively have this kind of tendency. Inorganic particles that are added into transparent material like this require that the sign of the rate of change of their refractive index with temperature is plus, or the sign of their thermal expansion coefficient is minus. Preferably, materials with property like these include $LiAlSiO_4$, $PbTiO_3$, $Sc_2W_3O_{12}$, $ZrW_2O_8$, $AlPO_4$, $Nb_2O_5$, $LiNbO_3$, PLZT. $Nb_2O_5$ and $LiNbO_3$ are preferably used among them.

Also these inorganic fine particles may be used singularly or with combination of two or more kinds. In case of using an organic polymer as transparent material, $Nb_2O_5$ and $LiNbO_3$ are particularly preferably used among the above-exemplified inorganic fine particles from the viewpoint of synthesizing inorganic fine particles of a particle size required for preservation of the high transparency and controlling compatibility to the organic polymer.

Whereas the shape of the inorganic fine particles may be any one of a spherical shape, an elliptical shape, a flat shape, a rod-like shape, and the like, an effect obtained by the present invention can work efficiently particularly in the case of a spherical shape.

As for a method for producing the inorganic fine particles, which is not limited particularly, such a method as pyrolysis of metal salt, hydrolysis of metal salt or metal alkoxide is known well. As for pyrolysis of metal salt, it is obtained by spraying metal salt or solution of metal salt for thermolysis. As for hydrolysis of metal salt or metal alkoxide, it is obtained by preparing solution of metal salt or metal alkoxide in advance and introducing water into the solution to proceed hydrolysis polymerization.

It is desired that the average particle size of the inorganic fine particles is smaller than the wavelength of light which transmits through an optical element, or whose propagation, such as refraction and diffraction, is controlled by an optical element. The average particle size is preferably from 1 to 1000 nm and more preferably from 2 to 100 nm, while varying with light wavelength in concrete terms.

Because the average particle size of the inorganic fine particles is within the above-described range, the particle size is relatively small in comparison with the wavelength of light whose propagation is controlled. Therefore preservation of high transparency is possible.

Combination of the above-described inorganic fine particles and the organic polymer is not limited particularly, and they should be combined suitably depending on a use, a purpose, and the like of an optical element. Combination of methacrylate resin or polycarbonate resin and $Nb_2O_5$ or $LiNbO_3$, and the like are particularly preferable in the case of the purpose of a favorable molding process.

Preferably, the inorganic fine particles have a functional group (for example, a group for improving the affinity the above-described organic polymer, a group having reactivity by putting such an external load thereon, as heat, mechanical pressure, and addition of water or steam (a reactive group), a photosensitive group and the like).

The above-described inorganic fine particles can be fixed on the surface of the organic polymer and the like steadily by composition like this.

This kind of functional group includes, for example, a (meth)acryloyl group, a carboxyl group, a carbonyl group, a hydroxyl group, an amide or N-substituted amide group, a vinyl group, an ester group, a ether group, a nitrile group, a glycidyl group, a diazo group, a halide alkyl group, an epoxy group, an isocyanate group.

In particular, superior optical transparency can be obtain more stably by fixing the inorganic fine particles by introducing functional groups into the inorganic fine particles and reacting the functional groups and the organic polymer in dispersing uniformly and supporting the inorganic fine particles in complex with the organic polymer without move or coagulation in the organic polymer. The inorganic fine particle with a functional group can be composed of the inorganic fine particle and the functional group introduced into the inorganic fine particle.

Preferably the functional group is a reactive group or a photosensitive group (particularly, polymerizable photosensitive group). The functional group can be introduced into the inorganic fine particles by a reaction between the inorganic fine particles and an organometallic compound with a hydrolytic polymerizable group and/or a photosensitive group (particularly, a silane coupling agent, a titanium coupling agent, and the like) organometallic compound or the condensate, surface graft reaction, CVD method (chemical vapor deposition), and the like.

In the present invention, a method for introducing the above-described inorganic functional group into the inorganic fine particles by surface modification is preferably used. In particular, the surface modification using a compound represented by the following chemical formula (1) is preferable:

$$Si(OR_1)_x(R_2)_{4-x} \qquad (1)$$

wherein X represents an integer number from 1 to 4, and each of $R_1$ and $R_2$ represents independently a monovalent combination group selected from the following group of chemical formulas (2):

(2)

wherein y represents an integer number from 1 to 30 and z represents an integer number from 0 to 5.

A method for surface modification using a compound represented by the chemical formula (1) is not limited particularly and may be applied with any heretofore known method. It includes, for example, the method of hydrolyzing a compound represented by the chemical formula (1) and modifying the surface of the inorganic fine particles under conditions of existence of water. As for this method, it is commonly believed that a catalyst such as an acid and an alkali is used properly, and hydroxyl groups on the surface of the inorganic fine particles and hydroxyl groups yielded by hydrolysis of a compound represented by the chemical formula (1) are dehydrated to form combination.

Preferably, the inorganic fine particles in the present invention are surface-modified with a compound represented by the chemical formula (1). For example, tetramethoxysilane, tetraethoxysilane, tetraisopropoxysilane, tetraphenoxysilane, methyltrimethoxysilane, ethyltrimethoxysilane, propyltrimethoxysilane, methyltriethoxysilane, methyltriphenoxysilane, ethyltriethoxysilane, phenyltrimethoxysilane, 3-methylphenyltrimethoxysilane, dimethyldimethoxysilane, diethyldiethoxysilane, diphenyldimethoxysilane, diphenyldiphenoxysilane, trimethylmethoxysilane, triethylethoxysilane, triphenylmethoxysilane, triphenylphenoxysilane and the like are used preferably.

These compounds are different in character such as a rate of reaction. Therefore it is possible to use a proper compound for conditions of surface modification and the like. Only one kind may be used and also a plurality of kinds may be used. Additionally the shape of the obtained inorganic fine particle is sometimes different depending on a compound to be used. The affinity to thermoplastic to be used in obtaining material composition can be designed due to selecting a compound to be used for surface modification. Although the percent of surface modification is not limited particularly, the ratio of the inorganic fine particles before surface modification to the inorganic fine particles after surface modification is preferably from 30 to 99 wt % and more preferably from 60 to 98 wt %.

In the inorganic fine particles introduced functional groups into, the introduced amount of the functional groups may be selected from the ranges of 0.5 to 50 wt parts and preferably 1 to 20 wt parts against 100 wt parts of the inorganic fine particle in terms of compound having functional groups.

The mixing percent of optically transparent material and inorganic fine particles is not limited, because condition for athermalization is different depending on combination of transparent material and inorganic fine particles, and a wavelength at which a target optical element is used. For obtaining more superior transparency, more preferably the percent of inorganic fine particles is not more than 95 wt % of the total amount of organic polymer and inorganic fine particles in terms of solid content.

[Optical Element]

An optical element of the present invention is what is exemplified by a lens, a filter, a grating, an optical fiber, and a planar optical waveguide, and controls a mode of light propagation through transmission, reflection, refraction, diffraction and the like. The operation modes in an optical element exemplified hereby are shown in FIGS. 1A to 1D. The present invention can exert thus an effect for any optical element for controlling a mode of light propagation through transmission, reflection, refraction, diffraction and the like. In particular, it is possible to bring a good effect by the present invention when transparent organic polymer which is superior in moldability, economy, and lightweight properties and yet has disadvantage that the rate of change of the refractive index with temperature is minus and in the order of magnitude of $10^{-4}/°C$, which is one order of magnitude larger than inorganic transparent material.

[Preparation of Optical Element]

An optical element with complex of an organic polymer and inorganic fine particles can be produced by a conventional method known commonly as a molding method of an organic polymer.

For example, it is possible to use the cast molding method, which mixes an organic polymer and inorganic fine particles, pours the mixture into a suitable mold (die) for a desired optical element, and solidifies it to obtain a molded article. In the cast molding method, an auxiliary means, such as heating and photoirradiation, may be used for solidification.

Alternatively, there is a method which coats liquid with mixture of an organic polymer and inorganic fine particles on a suitable substrate and solidifies it to obtain a film. The spin coating method, the bar coating method, the roll coating method and the like are known as a method for coating liquid mixture of an organic polymer and inorganic fine particles on a suitable substrate.

In case that an optical element produced by the present invention is an optical fiber, spinning methods for a silicic glass optical fiber and a plastic optical fiber. That is, liquid with mixture of an organic polymer and inorganic fine particles is injected from exit wounds by use of a gear pump or the like and then rolled onto a drum or a bobbin. Alternatively, it is possible that, after mixture of an organic polymer and inorganic fine particles solidified, the end is melted by heating in an oven and the molten composite of an organic polymer and inorganic fine particles is rolled onto a drum or a bobbin. A method for producing an optical fiber is described in detail, for example, in J. P. Harmon and G. K. Noren, "Optical Polymers", American Chemical Society, pp. 5 (2001).

EXAMPLE

Hereinbelow the present invention will be described in more detail by examples, but is not limited to these examples.

Example 1

<Production of Inorganic Fine Particles>

A solution of 2.5 g of pentaethoxyniobium in 30.75 g of ethyleneglycol monomethyl ether was prepared. A mixed solution of 0.34 g of water and 32.91 g of ethyleneglycol monomethyl ether was dropped to the solution under stirring. After 16 hours of stirring at room temperature, it was concentrated so that the oxide concentration might be 3 wt % and $Nb_2O_5$ dispersion liquid was obtained. According to measuring the distribution of particle size of the obtained $Nb_2O_5$ in the dispersion liquid by the dynamic scattering method, the average particle size was 6 nm.

<Production of Liquid Mixture of Transparent Material and Inorganic Fine Particles>

Photopolymerizable acrylic resin "Cyclomer" (produced by DAICEL Chemical Industries), which is an organic polymer, was used as transparent material. This organic polymer, the inorganic fine particles prepared by the above described method, and photo-induced radical generator "Irgacure369" (brand name, produced by Ciba Geigy Corp.) were mixed in PGMEA and stirred for 2 hours at room temperature, and then liquid mixtures were obtained. The mixing concentrations as the $Nb_2O_5$ weight fraction were set as following, respectively.

<Refractive Index of Composite Film of Optically Transparent Material and Inorganic Fine Particles>

As for mixture liquid prepared as above, liquids where the concentration of $Nb_2O_5$ was 0%, 25%, 50%, and 70% were prepared. The liquids were coated on silicon substrates by the spin coating method and dried at 90° C. for 30 seconds. Additionally the dried samples were exposed to 500 mJ/cm$^2$ by an ultra-high pressure mercury lamp, and then composite films of the organic polymer and the inorganic fine particles were obtained. As for the rate of change of the refractive index of $Nb_2O_5$ with temperature and the rate of change of the refractive index of photopolymerizable acrylic resin "Cyclomer" (produced by DAICEL Chemical Industries) with temperature, the former was $+7.8 \times 10^{-6}$ and the latter was $-3.1 \times 10^{-4}$, and they were opposite each other in sign.

Figure 2:
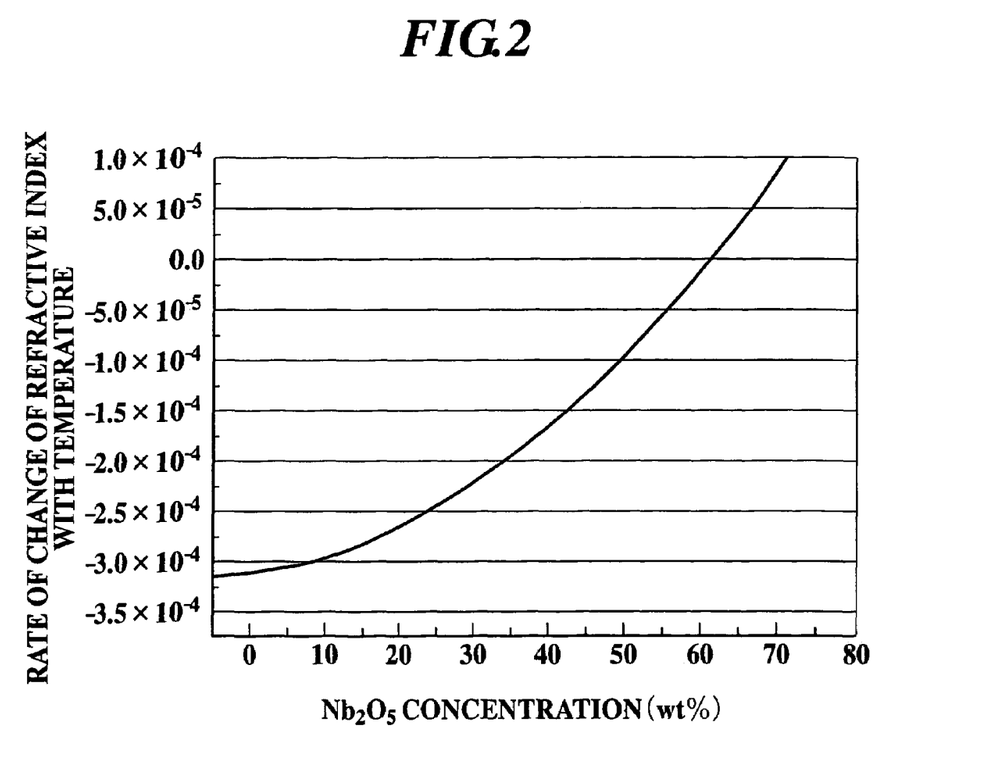
FIG. 2 is a graph showing the temperature dependency of the refractive index of composite film of an organic polymer and inorganic fine particles used in example 1 in optical materials forming optical elements according to the present invention.

Secondly a plate heater using a rubber heater (1 mm thick) sandwiched by a copper plate (1.5 mm thick) and a Teflon plate (registered trademark) (3.5 mm thick) was provided. The above-described silicon substrate on which the composite film composed of the organic polymer and the inorganic fine particles was formed was placed on the copper plate, and the refractive index at a wavelength of 0.633 μm was measured by spectral reflectometry. In the measurement of the refractive index, the temperature as the surface temperature of the copper plate was varied from room temperature to 80° C. by raising the temperature of the rubber heater, and the refractive index of each sample at each temperature was measured. Furthermore the rate of change of the refractive index with temperature of each of composite films whose $Nb_2O_5$ concentration were different was observed from the result. Thus $Nb_2O_5$ concentration dependency of the rate of change with temperature (unit: %) shown in FIG. 2 was obtained. From this result, it was found that the rate of change of the refractive index with temperature was reduced to zero and athermalized when the $Nb_2O_5$ concentration was 63%.

<Prism Coupling Method>

Figure 3:
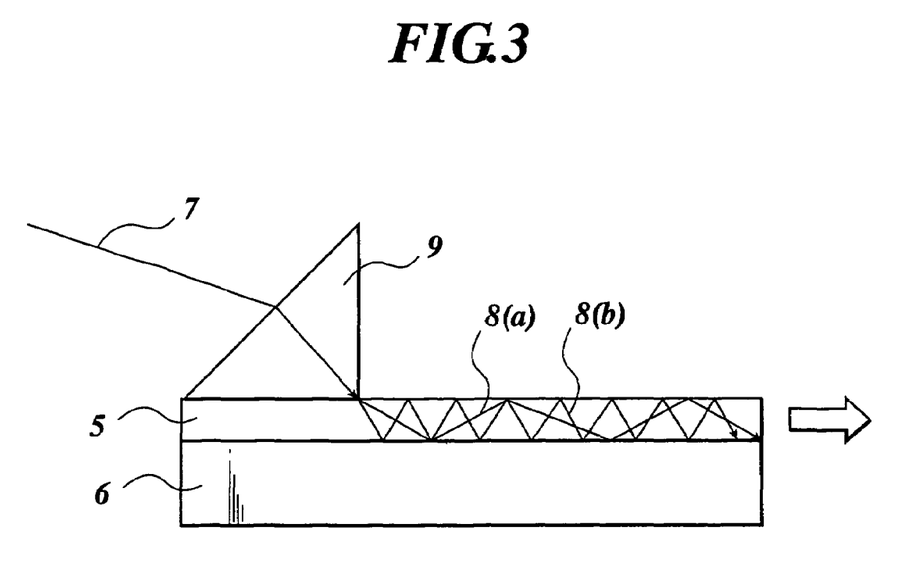
FIG. 3 is an illustration showing optical waveguide operation by the prism coupling method in optical waveguide elements shown in the examples and comparative example in optical elements according to the present invention.

A prism coupling method was used for fabrication of an optical element and function verification of the optical element. More specifically, as shown in FIG. 3, after a prism 9 with a refractive index higher than the refractive index of a waveguide film 5 is attached firmly onto the waveguide film, a laser beam 7 is introduced into the prism 9. The laser beam 7 will reflect totally on the edge of the rectangular part to return toward the incident direction. In case that the prism 9 is attached firmly enough onto the waveguide 5, however, an evanescent wave formed outside of the prism is coupled to the waveguide 5 in the total reflection, and propagates as a guided wave 8 with total reflection in the waveguide 5. In this time, the wave is separated into guided modes, each of which propagates a different distance under total reflections depending on the thickness of the waveguide 5 as represented by 8(a) and 8(b).

Figure 4:
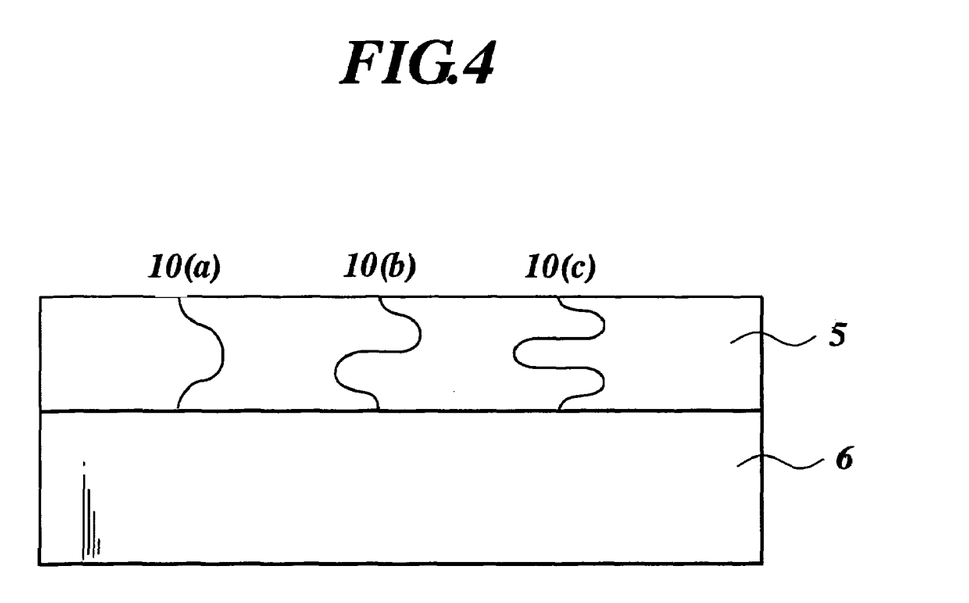
FIG. 4 is an illustration showing each waveguide mode has a different electromagnetic field distribution in an optical waveguide element in optical elements according to the present invention.

These guided modes correspond to waves having the condition that a standing wave is formed in the thickness direction of the waveguide 5 in the process of propagation of the laser beam 7 coupled to the waveguide 5. The appearance is shown in FIG. 4. Reference numerals 10(a), 10(b), and 10(c) shown in FIG. 4 represent electromagnetic intensity distributions of guided mode corresponding to mode number of zeroth order, first order, and second order, respectively. As just described, a effective propagation velocity of each guided mode is different because light propagating through a waveguide is separated into a plurality of guided modes. Because the velocity v of light propagating through a medium with a refractive index n is represented by the following formula (3) when the velocity of light in a vacuum is c, a different propagation velocity of each guided mode corresponds to a different effective refractive index seen by each guided mode.

$$v = c/n \quad (3)$$

<Production of Optical Element>

In the same way as above, a composite film of the organic polymer and the inorganic fine particles where the concentration of $Nb_2O_5$ was 63% was formed on a quartz substrate by the spin coating method and dried at 90° C. for 30 seconds, then were exposed to 500 mJ/cm$^2$ by an ultra-high pressure mercury lamp, and a composite film of the organic polymer and inorganic fine particles was obtained. A laser beam of a wavelength of 0.633 μm was introduced into the composite film of the organic polymer and the inorganic fine particles produced in this way by a prism coupling method as shown in FIG. 3, and it was confirmed to function as an optical waveguide. Also the light that a laser beam propagating in the composite film, which was an optical waveguide, generated by scattering was measured by the scattered light detection method (Nishihara et al., "Integrated Optics", pp. 252, Ohmsha, (1985)) and it was confirmed to be 4.5 dB/cm.

<Temperature Dependency of Refractive Index of Optical Element>

Figure 5:
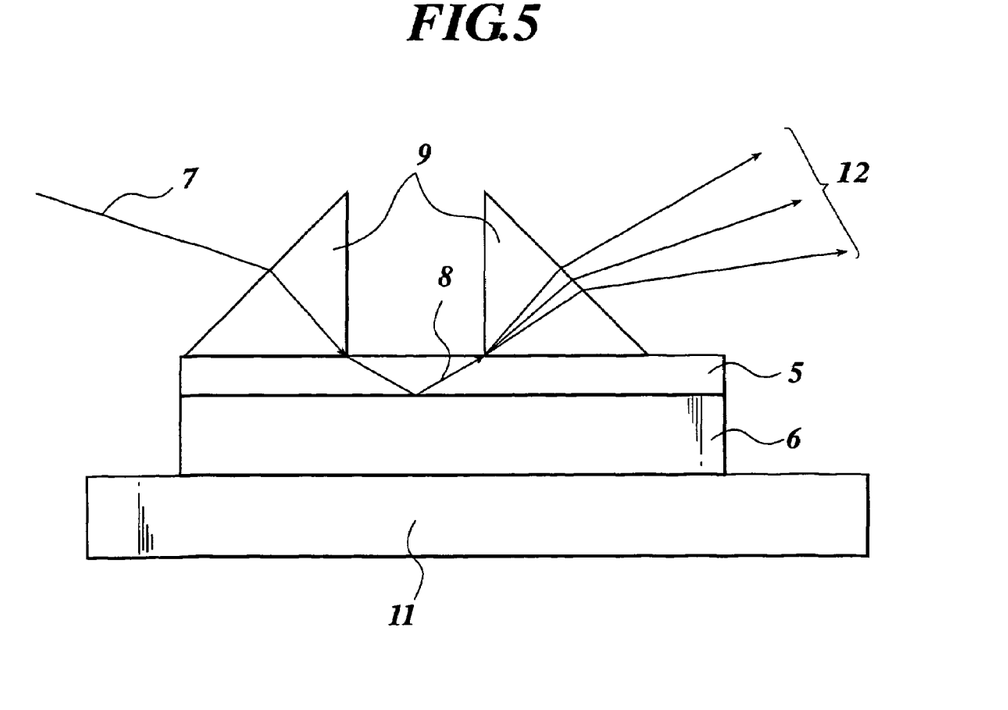
FIG. 5 is an illustration showing observation of the m-line method by the prism coupling method in optical waveguide elements shown in the examples and comparative example in optical elements according to the present invention.

A laser beam was guided into the optical waveguide obtained as above by the prism coupling method under heating by use of a heater 11 as shown in FIG. 5. As described above, the guided wave 8 is separated into plural guided mode waves, each of which sees a different effective refractive index. In decoupling of guided mode waves like these from the other prism 9, the angle of diffraction from the prism edge varies depending on relative relationship between the effective refractive index of each guided mode and the refractive index of the prism, and plural outgoing beams called m-line 12 are obtain (Nishihara et al., "Integrated Optics", pp. 242, Ohmsha (1985)). This m-line was observed also in the present example. Consequently, it was confirmed that the position of m-line was not displaced substantially and the refractive index of a waveguide composed of the composite film of the organic polymer and the inorganic fine particles did not change with temperature.

Example 2

<Production of Inorganic Fine Particles>

A solution of 30.0 g of pentaethoxyniobium in 248.78 g of ethyleneglycol monomethyl ether was prepared. A mixed solution of 3.96 g of lithium hydroxide and 1.70 g of water in 273.13 g of ethyleneglycol monomethyl ether was dropped to the solution under stirring. After 16 hours of stirring at room temperature, it was concentrated so that the oxide concentration might be 10 wt % and $LiNbO_3$ dispersion liquid was obtained. According to measuring the distribution of particle size of the obtained $LiNbO_3$ fluid dispersion by the dynamic scattering method, the average particle size was 3 nm.

<Production of Liquid Mixture of Transparent Material and Inorganic Fine Particles>

Photopolymerizable acrylic resin "Cyclomer" (produced by DAICEL Chemical Industries), which is an organic polymer, was used as transparent material. This organic polymer, the inorganic fine particles prepared by the above described method, and photo-induced radical generator "irgacure369" (brand name, produced by Ciba Geigy Corp.) were mixed in PGMEA and stirred for 2 hours at room temperature, and then liquid mixtures were obtained. The mixing concentrations as the $LiNbO_3$ weight fraction was set as following, respectively.

<Refractive Index of Composite Film of Optically Transparent Material and Inorganic Fine Particles>

As for mixture liquid prepared as above, liquids where the concentration of $Nb_2O_5$ was 0%, 25%, and 50% were prepared. The liquids were coated on silicon substrates by the spin coating method and dried at 90° C. for 30 seconds. Additionally the dried samples were exposed to 500 $mJ/cm^2$ by an ultra-high pressure mercury lamp, and then composite films of an organic polymer and inorganic fine particles were obtained. As for the rate of change of the refractive index of $LiNbO_3$ with temperature and the rate of change of the refractive index of photopolymerizable acrylic resin "Cyclomer" (produced by DAICEL Chemical Industries) with temperature, the former was $+2.9 \times 10^{-5}$ and the latter was $-3.1 \times 10^{-4}$, and they were opposite each other in sign.

Figure 6:
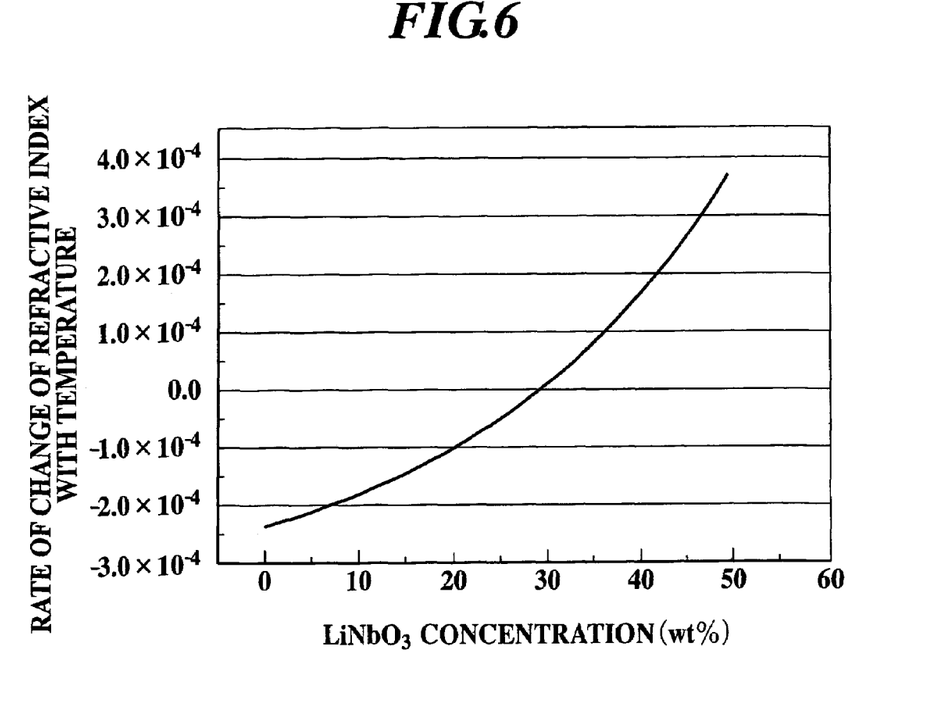
FIG. 6 is a graph showing the temperature dependency of the refractive index of composite film of an organic polymer and inorganic fine particles used in example 1 in optical materials forming optical elements according to the present invention.

Secondly a plate heater using a rubber heater (1 mm thick) sandwiched by a copper plate (1.5 mm thick) and a Teflon plate (3.5 mm thick) was provided. The above-described silicon substrate on which the composite film composed of an organic polymer and inorganic fine particles was formed was placed on the copper plate, and the refractive index at a wavelength of 0.633 μm was measured by spectral reflectometry. In the measurement of the refractive index, the surface temperature of the copper plate was varied from room temperature to 80° C. by raising the temperature of the rubber heater, and the refractive index of each sample at each temperature was measured. Furthermore the rate of change of the refractive index with temperature of each of composite films whose $LiNbO_3$ concentration were different was observed from the result. Thus $LiNbO_3$ concentration dependency of the rate of change with temperature (unit: %) shown in FIG. 6 was obtained. From this result, it was found that the rate of change of the refractive index with temperature was reduced to zero and athermalized when the $LiNbO_3$ concentration was about 30%.

<Production of Optical Element>

In the same way as above, a composite film of the organic polymer and the inorganic fine particles where the concentration of $LiNbO_3$ was 30% was formed on quartz substrate by the spin coating method and dried at 90° C. for 30 seconds, then was exposed to 500 $mJ/cm^2$ by an ultra-high pressure mercury lamp, and a composite film of the organic polymer and the inorganic fine particles was obtained. A laser beam of a wavelength of 0.633 μm was introduced into the composite film of the organic polymer and the inorganic fine particles produced in this way by a prism coupling method as shown in FIG. 3, and it was confirmed to function as an optical waveguide. Also it was measured by the scattered light detection method in the same way as the example 1, and it was confirmed to be 3.2 db/cm.

<Temperature Dependency of Refractive Index of Optical Element>

A laser beam was guided into the optical waveguide obtained as above by the prism coupling method under heating by use of a heater 11 as shown in FIG. 5. In the same way as the example 1, after observation of m-line the guided wave 8 is separated into plural guided mode waves, each of which sees a different effective refractive index as described above. In decoupling of guided mode waves like these from the other prism 9, the angle of diffraction from the prism edge varies depending on relative relationship between the effective refractive index of each guided mode and the refractive index of the prism, and plural outgoing beams called m-line 12 are obtain (Nishihara et al., "Integrated Optics", pp. 242, Ohmsha (1985)). This m-line was observed also in the present example. Consequently, it was confirmed that the position of m-line was not displaced substantially and the refractive index of a waveguide composed of a composite film of the organic polymer and the inorganic fine particles did not change with temperature.

Comparative Example

In the same way as the above-described examples, photopolymerizable acrylic resin "Cyclomer" (produced by DAICEL Chemical Industries), which is an organic polymer, was used as transparent material, mixed with photo-induced radical generator "irgacure369" (brand name, produced by Ciba Geigy Corp.) and PGMEA, and stirred for 2 hours at room temperature. Then a coating liquid was obtained. Neither above-described $Nb_2O_5$ nor $LiNbO_3$ were added.

The coating liquid obtained as above was coated on a quartz substrate by the spin coating method, dried at 90° C. for 30 seconds. Additionally the coated sample was exposed to 500 $mJ/cm^2$ by an ultra-high pressure mercury lamp, and then an organic polymer film was obtained.

A laser beam of a wavelength of 0.633 μm was introduced by a prism coupling method into the organic polymer film produced in this way as shown in FIG. 3, and it was confirmed to function as an optical waveguide. Also it was measured by the scattered light detection method in the same way as the examples, and the propagation loss was confirmed to be 4.7 dB/cm.

Furthermore m-line was observed by the prism coupling method, as the optical waveguide obtained in the above was heated as shown in FIG. 4 in the same way as the examples. Consequently, it was confirmed that the position of m-line was displaced with temperature change. It means that the refractive index of the organic polymer film, a waveguide, changes with temperature and accordingly the effective refractive index seen by a guided wave varies as well.

An optical element of the present invention is, as above, an optical element for controlling light propagation such as optical transmission, reflection, refraction, and diffraction, and the composition composed of transparent optical material and inorganic fine particles whose signs of the rate of change of the refractive indexes or signs of thermal expansion coefficients are different from each other.

Due to the above-described composition:

(1) Athermalization (making refractive index independent of temperature) can be accomplished in comparison with an optical element formed by the transparent optical material alone.

(2) It is possible to set widely the range of selection of transparent optical material and inorganic fine particles material whose rates of change of the refractive indexes with temperature or thermal expansion coefficients are opposite in sign and the width of control of mixing concentration.

The entire disclosure of Japanese Patent Applications No. Tokugan 2003-171631 filed on Jun. 17, 2003 including specification, claims, drawings and summary are incorporated herein by reference in its entirety.

What is claimed is:

1. An optical element for controlling light propagation, comprising:
   a transparent material; and
   inorganic fine particles dispersed in the transparent material,
   wherein the transparent material and the inorganic fine particles meet at least one of following a) and b):
   a) a rate of change of a refractive index of the transparent material with temperature and a rate of change of a refractive index of the inorganic fine particles with temperature are opposite in sign, and
   b) a thermal expansion coefficient of the transparent material and a thermal expansion coefficient of the inorganic fine particles are opposite in sign,
   wherein the inorganic fine particles comprise a functional group, the functional group being introduced into the inorganic fine particles by surface modification, and
   wherein the transparent material is an organic polymer.

2. An optical element for controlling light propagation, comprising:
   a transparent material; and
   inorganic fine particles dispersed in the transparent material,
   wherein the transparent material and the inorganic fine particles meet at least one of following a) and b):
   a) a rate of change of a refractive index of the transparent material with temperature and a rate of change of a refractive index of the inorganic fine particles with temperature are opposite in sign, and
   b) a thermal expansion coefficient of the transparent material and a thermal expansion coefficient of the inorganic fine particles are opposite in sign,
   wherein the inorganic fine particles comprise a functional group, the functional group being introduced into the inorganic fine particles by surface modification, and
   wherein the functional group is at least one of a group enhancing an affinity for the organic polymer, a reactive group, and a photosensitive group.

3. An optical element for controlling light propagation, comprising:
   a transparent material; and
   inorganic fine particles dispersed in the transparent material,
   wherein the transparent material and the inorganic fine particles meet at least one of following a) and b):
   a) a rate of change of a refractive index of the transparent material with temperature and a rate of change of a refractive index of the inorganic fine particles with temperature are opposite in sign, and
   b) a thermal expansion coefficient of the transparent material and a thermal expansion coefficient of the inorganic fine particles are opposite in sign,
   wherein the inorganic fine particles comprise a functional group, the functional group being introduced into the inorganic fine particles by surface modification, and
   wherein an amount of the functional group in the inorganic fine particles is 0.5 to 50 wt % in terms of a compound comprising the functional group.

4. The optical element of claim 1,
   wherein the inorganic fine particles include at least one inorganic material selected from the group consisting of $LiAlSiO_4$, $PbTiO_3$, $Sc_2W_3O_{12}$, $ZrW_2O_8$, $AlPO_4$, $Nb_2O_5$, $LiNbO_3$, and PLZT.

5. The optical element of claim 4, wherein the rate of change of the refractive index of the transparent material with temperature and the rate of change of the refractive index of the inorganic fine particles with temperature are opposite in sign.

6. The optical element of claim 5, wherein the thermal expansion coefficient of the transparent material and the thermal expansion coefficient of the inorganic fine particles are opposite in sign.

7. The optical element of claim 4, wherein the inorganic fine particles include at least one of $LiNbO_3$ and $Nb_2O_5$.

8. The optical element of claim 2, wherein the functional group is the reactive group or the photosensitive group.

9. The optical element of claim 8, wherein the functional group is a polymerizable photosensitive group.

10. The optical element of claim 3, wherein an amount of the functional group in the inorganic fine particles is 1 to 20 wt % in terms of a compound comprising the functional group.

11. The optical element of claim 1, wherein a percentage of the inorganic fine particles in the transparent material is not more than 96 wt % of a total amount of the organic polymer and the inorganic fine particles in terms of solid content.

12. The optical element of claim 11, wherein the inorganic fine particles are inorganic oxide particles and surface-modified with a compound represented by a following chemical formula (1):

$$Si(OR_1)_x(R_2)_{4-x} \quad (1)$$

wherein X represents an integer number from 1 to 4, and each of $R_1$ and $R_2$ represents independently a monovalent combination group selected from a following group of chemical formulas (2):

$$-C_yH_{(2y+1)}, \quad -C_yH_{(2y-1)}, \quad \begin{array}{c}[C_yH_{(2y+1)}]_z\\ \diagup\!\!\!\diagdown \end{array} \quad (2)$$

wherein y represents an integer number from 1 to 30 and z represents an integer number from 0 to 5.

13. The optical element of claim 12, wherein the compound represented by the chemical formula (1) is at least one of tetramethoxysilane, tetraethoxysilane, tetraisopropoxysilane, tetraphenoxysilane, methyltrimethoxysilane, ethyltrimethoxysilane, propyltrimethoxysilane, methyltriethoxysilane, methyltriphenoxysilane, ethyltriethoxysilane, phenyltrimethoxysilane, 3-methylphenyltrimethoxysilane, dimethyldimethoxysilane, diethyldiethoxysilane, diphenyldimethoxysilane, diphenyldiphenoxysilane, trimethylmethoxysilane, triethylethoxysilane, triphenylmethoxysilane and triphenylphenoxysilane.

14. The optical element of claim 11, wherein the functional group is at least one of a (meth)acryloyl group, a carboxyl group, a carbonyl group, a hydroxyl group, an amide group of N-substituted amide group, a vinyl group, an ester group, a nitrile group, a glycidyl group, a diazo group, a halide alkyl group, an epoxy group, and an isocyanate group.

* * * * *